Aug. 31, 1954 — R. O. BALOGH — 2,687,808
DERRICK

Filed Jan. 14, 1953 — 3 Sheets-Sheet 1

INVENTOR.
ROY O. BALOGH
BY *Alfred W. Ketcham*
ATTORNEY

Aug. 31, 1954 R. O. BALOGH 2,687,808
DERRICK
Filed Jan. 14, 1953 3 Sheets-Sheet 2
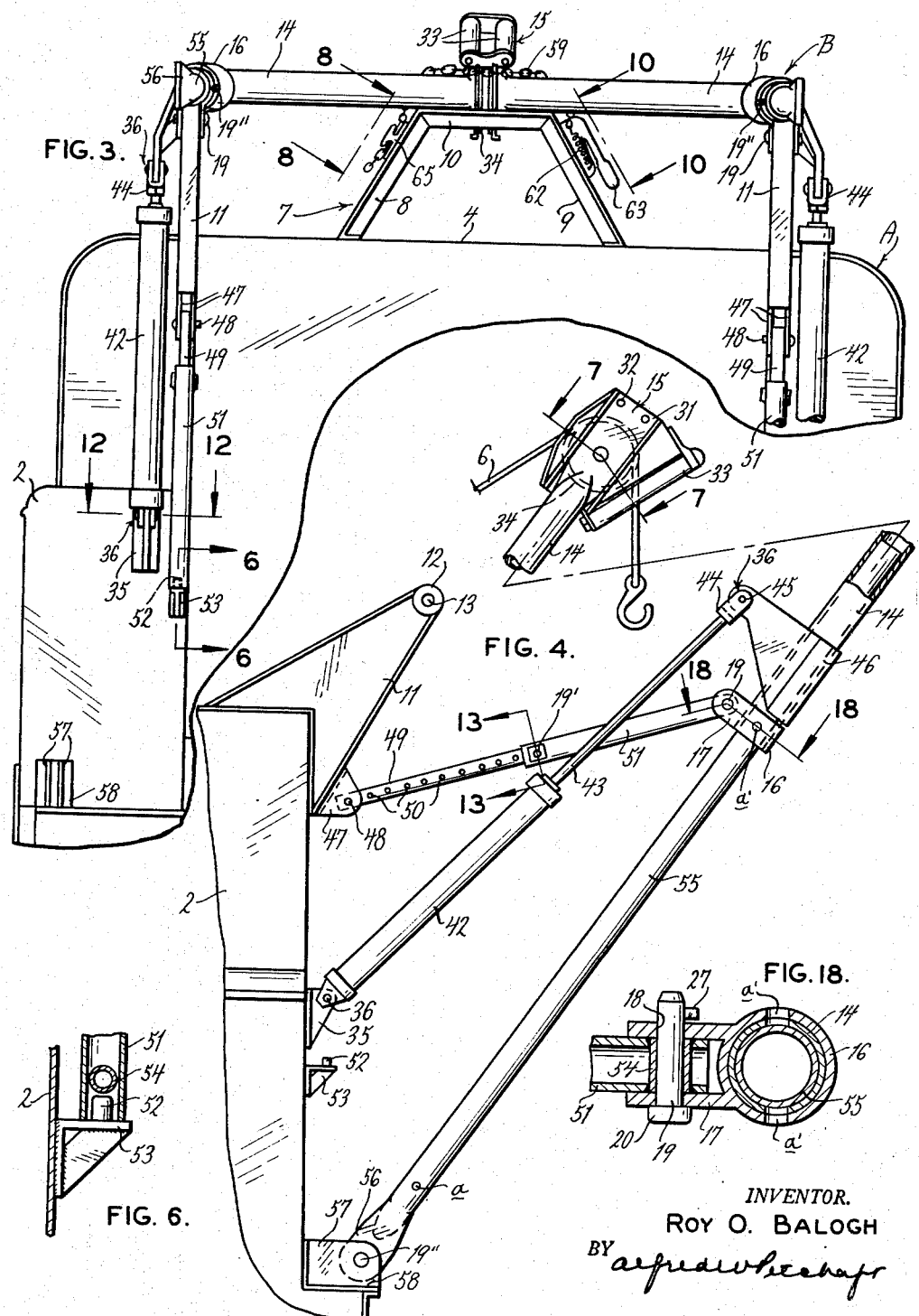
INVENTOR.
ROY O. BALOGH
ATTORNEY

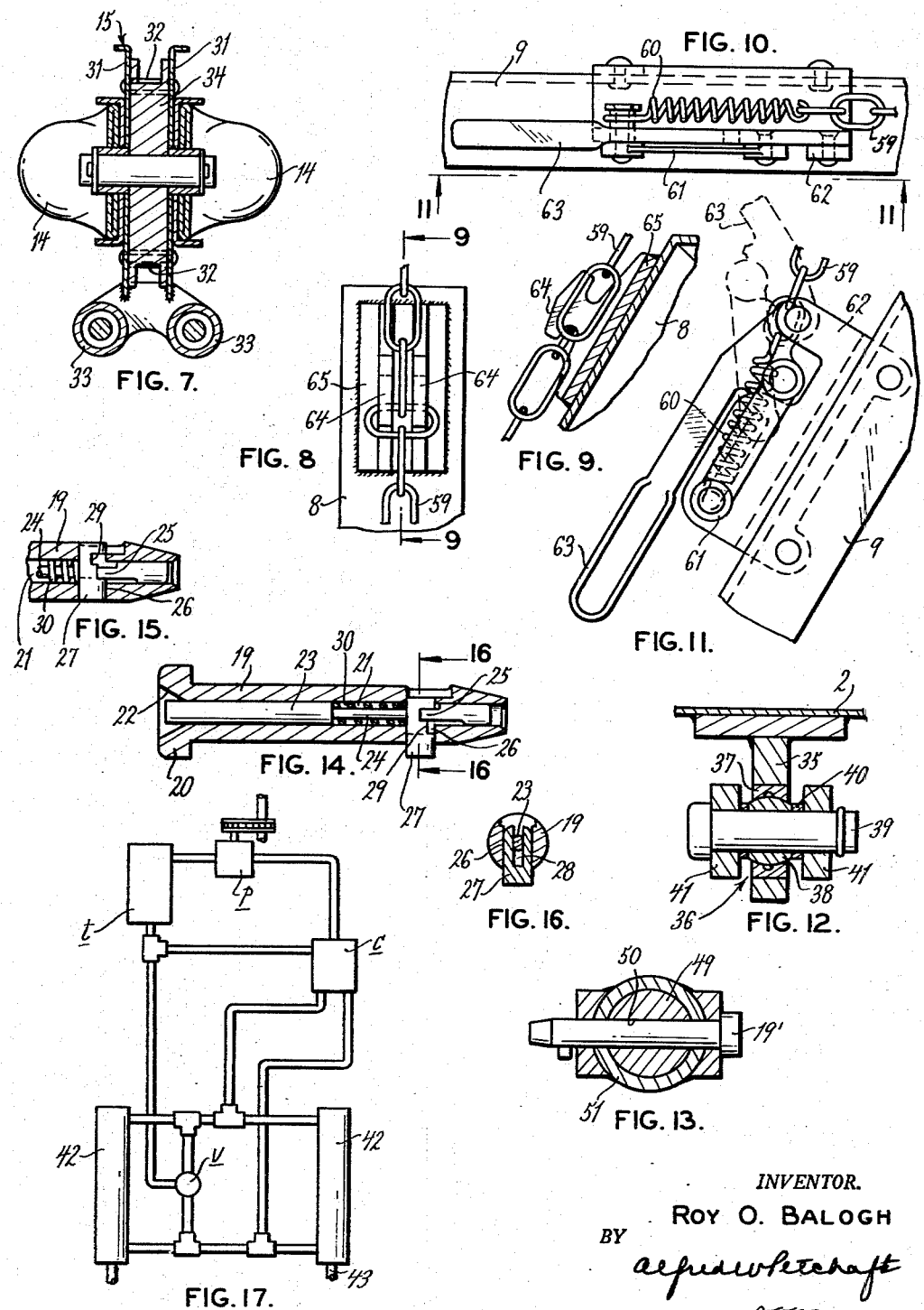

Patented Aug. 31, 1954

2,687,808

UNITED STATES PATENT OFFICE 2,687,808

DERRICK

Roy O. Balogh, Clayton, Mo., assignor to McCabe-Powers Auto Body Co., St. Louis, Mo., a corporation of Missouri Application January 14, 1953, Serial No. 331,243

3 Claims. (Cl. 212—8)

1

This invention relates in general to certain new and useful improvements in derricks and, more particularly, to an A-frame derrick adapted for use on utility truck bodies to facilitate the servicing of electric light, power, and telephone poles.

Public utilities, such as electric light companies, telephone companies, and the like, own and maintain an extensive system of poles and elevated structures for carrying transmission lines, switches, transformers and similar equipment and employ trucks equipped with various types of pole-derricks for use in service and maintenance operations of such equipment. It is ordinarily one of the safety requirements that the derrick be lowered or dismantled while the truck is moving from one job-site to another. Since maintenance problems usually relate to a series of poles along a particular line, it frequently becomes necessary to set up and dismantle the derrick equipment as the truck is moved along the line from pole to pole.

It is, therefore, the primary object of the present invention to provide a derrick which can be conveniently mounted upon a utility truck or vehicle and can be quickly and simply elevated and lowered with a minimum of manual effort.

It is a further object of the present invention to provide a derrick of the type stated which is simple and economical in construction and, when raised to operative position, provides an unusually rugged, strong derrick structure capable of handling substantial loads with ease and simplicity.

It is also an object of the present invention to provide a derrick of the type stated which is of such shape and configuration that it will not, when in inoperative or transport position, obstruct or otherwise interfere with the working area of the truck body on which it is mounted.

It is an additional object of the present invention to provide a derrick of the type stated which is extremely compact when in transport position and is adapted to be securely fastened in such position so that it cannot readily become loosened while the truck is being driven from place to place over rough roads or similar terrain.

It is a further object of the present invention to provide a derrick of the type stated which can, when in upright position, be shifted to various

2 positions of angularity within predetermined limits.

With the above and other objects in view, my invention resides in the novel features of form, construction, arrangement, and combination of parts presently described and pointed out in the claims.

In the accompanying drawings (three sheets)

Figure 3 is a fragmentary rear elevational view of the truck body with the pole derrick shown in inoperative or transport position;

Figure 4 is a fragmentary side elevational view of the rear portion of the truck body showing the pole derrick in elevated or operative position;

Figure 6 is a fragmentary sectional view taken along line 6—6 of Figure 3;

Figure 7 is a fragmentary sectional view taken along line 7—7 of Figure 4;

Figure 8 is a fragmentary sectional view taken along line 8—8 of Figure 3;

Figure 9 is a fragmentary sectional view taken along line 9—9 of Figure 8;

Figure 10 is a fragmentary sectional view taken along line 10—10 of Figure 3;

Figure 11 is a fragmentary sectional view taken along line 11—11 of Figure 10;

Figure 12 is a fragmentary sectional view taken along line 12—12 of Figure 3;

Figure 13 is a fragmentary sectional view taken along line 13—13 of Figure 4;

Figure 14 is a longitudinal sectional view of a locking pin forming a part of the present invention with the detent member thereof shown in extended or locking position;

Figure 15 is a fragmentary sectional view of the forward end of the locking pin showing the detent member in retracted position;

Figure 16 is a fragmentary sectional view taken along line 16—16 of Figure 14;

Figure 17 is a diagrammatic view of the hydraulic system employed in conjunction with and forming a part of the present invention; and Figure 18 is a fragmentary sectional view taken along line 18—18 of Figure 4.

Figure 1:
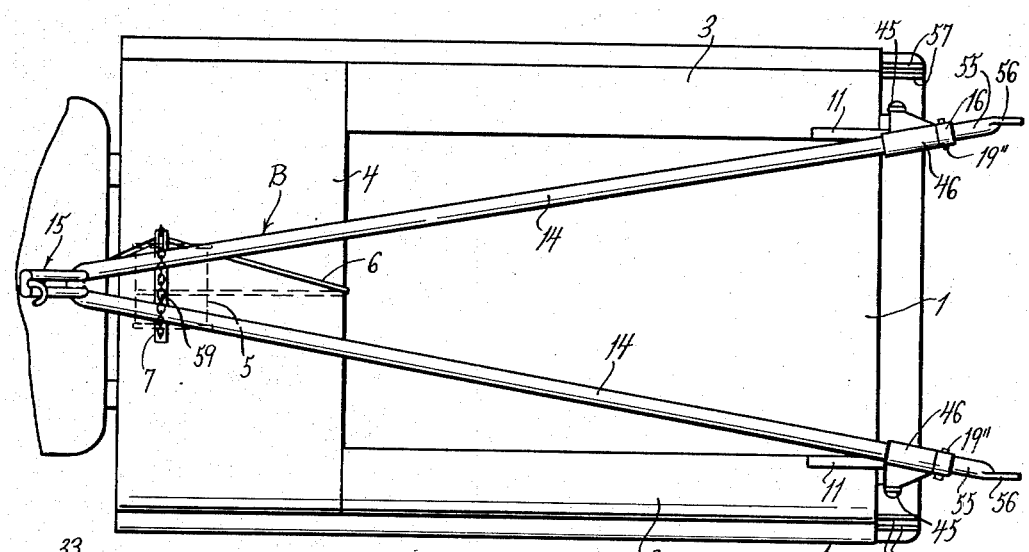
Figure 1 is a fragmentary top plan view of a utility truck equipped with a pole derrick constructed in accordance with and embodying the present invention, the pole derrick being shown in inoperative or transport position.

Referring now in more detail and by reference characters to the drawings, which illustrate a preferred embodiment of the present invention, A designates a utility truck body having a floor 1, compartmentalized side walls 2, 3, and a short roof portion 4 extending transversely between the forward ends of the side walls 2, 3. As will be seen by reference to Figure 1, the walls 2, 3, and roof portion 4 are so arranged that the rear end of the truck body A is substantially open topped and open ended. Also mounted in and adjacent to the floor 1 at the forward end of the truck body A is a conventional cable winch 5 having an upwardly and rearwardly extending cable 6. Secured or otherwise rigidly mounted across the forward end of the roof 4 and extending upwardly therefrom is a supporting frame 7 of inverted U-shape and integrally including outwardly diverging legs 8, 9, and a horizontal bight section 10. At their upper rear corners, the side walls 2, 3, are rigidly provided with rearwardly and upwardly extending hinge plates 11 provided with integrally formed end-eyes 12 having transversely aligned apertures 13.

Figure 2:
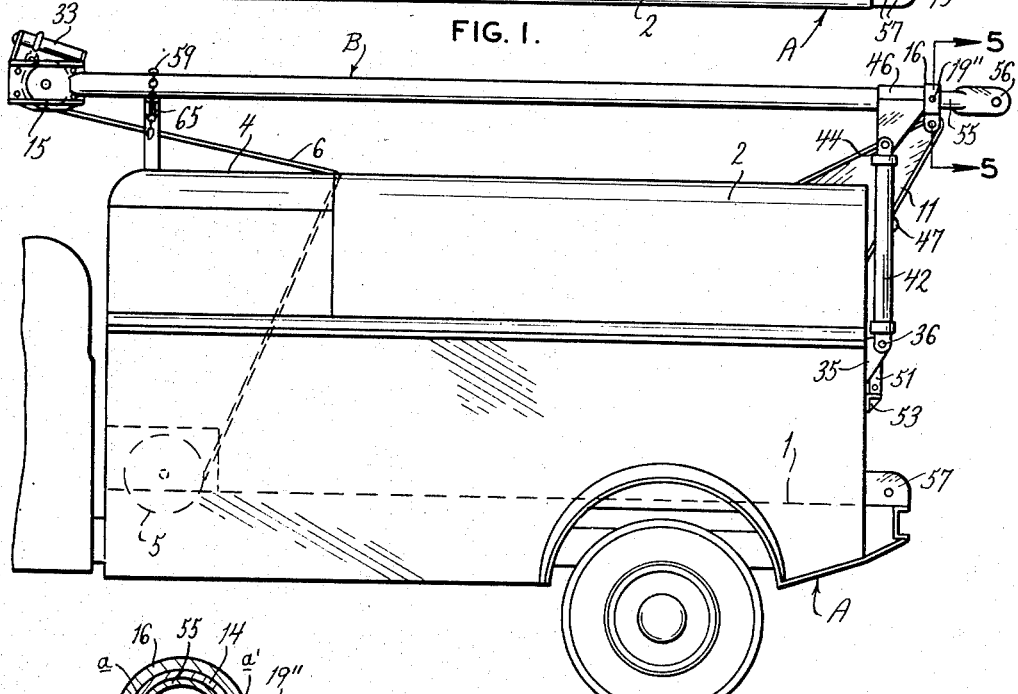
Figure 2 is a fragmentary side elevational view of the utility truck with the pole derrick shown in inoperative or transport position.
Figure 5:
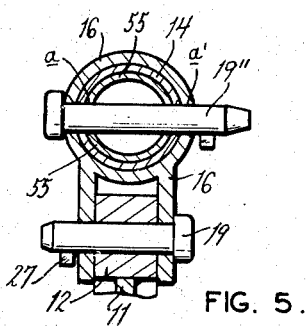
Figure 5 is a fragmentary sectional view taken along line 5—5 of Figure 2.

Adapted for removable and swingable disposition upon the hinge plates 11 is a pole derrick B having the shape or configuration of an inverted V and comprising two tubular derrick legs 14 connected at their upper ends by a head fitting 15 and each being provided at its lower end with a clevis-ring 16 having downwardly extending spaced parallel ears 17 spaced for snug-fitting disposition around the oppositely presented side faces of the end-eyes 12 and having apertures 18 adapted for alignment or registration with the aperture 13 thereof for receiving a locking pin 19 having a diametrally enlarged head 20 and being provided with an axial bore 21 conically countersunk, as at 22, adjacent the head end. Shiftably mounted in the bore 21 is a latch pin 23 which is turned down intermediate its ends in the provision of a diametrally reduced portion 24 and a flattened latching shoulder 25. The pin 19 is further provided with a transversely extending diametral bore 26 for receiving a transversely shiftable pin-like detent member 27 which is provided with an axial split or bifurcation 28 for transversely shiftable movement across the diametrally reduced portion 24 of the pin 23 and is provided with a two-shouldered detent notch 29 for engagement optionally in two different positions with the detent shoulder 25, as shown, respectively, in Figures 14 and 15. Disposed around the diametrally reduced portion 24 and disposed in compression against the detent member 27 is a spiral spring 30 adapted to impose sufficient friction producing pressure against the pin 27 so that it will remain in either of such two positions. At the head end of the pin 19, the latch pin 23 projects outwardly into the countersunk space 22 so that it may be shifted by finger pressure to release the detent member 27 and permit the latter to be manually shifted from the position shown in Figure 14 to the position shown in Figure 15 or the reverse, as may be required. When the pin 19 is in place, as shown in Figure 5, the detent member 27 will be in outwardly shifted position, that is to say the position shown in Figure 14 and the pin 19, therefore, cannot become accidentally dislodged or accidentally displaced and will serve to connect the clevis-rings 16 and the associated derrick legs 14 to the hinge plates 11, as shown in Figures 1 and 2.

The head fitting 15 consists of two spaced parallel plates 31, connected at the top by rivets 32 and provided along their forward edges with elongated guide rollers 33. Operatively mounted between the plates 31 is a sheave 34 over which the cable 6 is trained.

Welded or otherwise rigidly attached to the rear end of each of the side walls 2, 3, and projecting rearwardly therefrom are bracket-plates 35, each of which is transversely apertured and provided with a self-aligning swivel-joint 36 comprising a bearing collar 37 having a concave internal annular surface of spherical conformation for operatively receiving a swivel-ring 38 adapted for receiving a swivel pin 39 which extends transversely therethrough and is provided at its opposite ends with washers 40. Rockably mounted on the swivel pin 39 and seated against the washers 40 on opposite sides of the swivel-ring 38 are spaced parallel ears 41 integrally formed upon the lower end of a conventional hydraulic cylinder 42 having an upwardly extensible piston rod 43 which is, in turn, provided with an end fitting 44 having spaced parallel ears 45 rockably mounted upon a second swivel-joint 36 forming a part of a second bracket-plate 46 welded to the lower end of and laterally offset from each derrick leg 14, all as best seen in Figures 3 and 4.

The hydraulic cylinders are conventionally connected to an oil-pressure system consisting of a pump $p$, a reservoir-tank $t$, a manual control valve $c$, and an overload release valve $v$, all as diagrammatically shown in Figure 17.

Welded to the lower portion of and projecting rearwardly from each hinge plate 11 is a pair of spaced parallel ears 47 and rockably mounted therebetween, by means of a hinge pin 48 is a brace-rod 49 having a series of uniformly spaced diametral apertures 50 and being disposed telescopically in a tubular brace-sleeve 51 which is adjustably connected thereto by a locking pin 19', substantially identical in all respects with the previously described locking pin 19. At their lower ends, the brace-sleeves 51 are disengageably seated upon a retention stud 52 projecting upwardly from small carrying brackets 53 which are, in turn, welded or otherwise rigidly secured upon the rear end faces of the side walls 2, 3, respectively. Adjacent their lower ends, the brace-sleeves 51 are further provided with diametrally extending short bearing quills 54, as shown in Figures 3 and 6.

Telescopically disposed within each of the derrick legs 14 and extending rearwardly therefrom are extension legs 55 which are flattened at their outer ends in the provision of terminal portions 56 adapted for rocking disposition between pairs of spaced parallel plates 57 forming an integral part of anchor fittings 58 which are, in turn, welded or otherwise rigidly secured upon the rear end faces of the side walls 2, 3, in downwardly spaced relation to the bracket plates 35. The terminal portions 56 are releasably secured to the anchor fittings 58 by means of locking pins 19'' identical with the previously described locking pins 19. When in transport position, the extension legs 55 are held in telescoped position within the derrick legs 14 by means of the same locking pins 19'', which are inserted through aligned apertures $a$, $a'$, in the extension legs 55 and clevis-rings 16, respectively.

The derrick B is releasably fastened in transport position, that is to say the horizontal position shown in Figures 1 and 2, by means of a hold-down chain 59 attached at one end to one end of a spring 60 which is, in turn, secured at its other end to a toggle link 61 pivotally mounted at one end on a fulcrum-plate 62 welded to the leg 9 of the supporting frame 7. The toggle link 61 is also eccentrically pivoted at its other end upon a handle lever 63 which is, in turn, pivoted upon the fulcrum-plate 62 upwardly of the toggle link 61, as shown in Figure 11. The other end of the hold-down chain 59 is adjustably disposed between a pair of spaced parallel upstanding ears 64 forming integral parts of a chain catch 65, one of the links of the hold-down chain 59 being turned at right angles to the normal direction of the other links, as shown in Figures 8 and 9. When the derrick is lowered to transport position, the handle lever 63 may be swung up to the position shown in dotted lines in Figure 11 and the hold-down chain 59 thrown over the derrick legs 14. The free end of the hold-down chain 59 is then pulled tight and fastened into the chain catch 65, thereby applying some tension to the spring 60. Finally, the handle lever 63 is forcibly swung back to the position shown in full lines in Figure 11, locking the derrick B in transport position.

In erecting the derrick B, that is to say swinging it into operative position, as shown in Figure 4, the hold-down chain 59 is released and, thereupon, the pump p and manual control valve c are operated to introduce oil under pressure to the cylinders 42, causing the piston rods 43 to extend and swing the derrick legs 14 into substantially vertical position. The extension legs 55 are then released by removal of the pins 19" and are drawn down into the anchor fittings 56 and swingably secured therein by appropriate relocation of the pins 19".

Thereupon, the pins 19 are removed and additional oil is admitted to the cylinders 42, thereby swinging the derrick B rearwardly and outwardly to the desired angle of inclination. The tubular brace-sleeves 51 are released by removal of the locking pin 19' and disengaged from the retention stud 52 by an upward lifting movement. The brace-sleeves 51 are then pulled out and swung upwardly until their ends are disposed between the ears 17 of the clevis-rings 16 and are then fastened in such position by relocation of the pins 19. Finally, the brace-sleeves 51 are secured in such extended position by suitable relocation of the locking pins 19'. If necessary, oil can be released from or admitted to the cylinders 42 to shift the position of the derrick legs 14 slightly so that one of the apertures 50 will be properly aligned. The derrick B may be returned to transport position by a reverse series of operations.

It should be understood that changes and modifications in the form, construction, arrangement, and combination of the several parts of the derrick may be made and substituted for those herein shown and described without departing from the nature and principle of my invention.

Having thus described my invention, what I claim and desire to secure by Letters Patent is:

1. A truck-body comprising transversely spaced upright members with rearwardly presented faces adjacent the rear end of the truck-body, first pivot-forming brackets mounted adjacent the upper ends of each of said upright members and extending outwardly in overhanging relation to the plane of the rearwardly presented faces thereof, said brackets having pivot means located rearwardly of said plane, a derrick having two converging legs operatively connected at their upper ends and being pivotally and releasably mounted adjacent to their lower ends upon the pivot means of the pivot-forming members and adapted to swing from a horizontal position to an upright position, power driven means operatively mounted between the pivot means and the plane of the rearwardly presented faces of the truck-body for optionally swinging the derrick with respect to the pivot-forming members, second pivot-forming members located below the first pivot-forming members for optional engagement with the lower ends of the derrick when the latter is in upright position whereby the engagement between the first pivot members and the derrick can be released leaving the derrick to pivot upon the second pivot-forming members and swing outwardly into an operative position, and a brace member adapted for engagement with the derrick below the offset bearing means and being attached at its other end to a rearward face of the truck body substantially above the lower end of the power driven means so as to extend in crossing position in relation to the power driven means when it is swung out into operative position.

2. A truck-body comprising transversely spaced upright members with rearwardly presented faces adjacent the rear end of the truck-body, first pivot-forming brackets mounted adjacent the upper ends of each of said upright members and extending outwardly in overhanging relation to the plane of the rearwardly presented faces thereof, said brackets having pivot means located rearwardly of said plane, a derrick having two converging legs operatively connected at their upper ends and being pivotally and releasably mounted adjacent to their lower ends upon the pivot means of the pivot-forming members and adapted to swing from a horizontal position to an upright position, power driven means operatively mounted between the pivot means and the plane of the rearwardly presented faces of the truck-body for optionally swinging the derrick with respect to the pivot-forming members, second pivot-forming members located below the first pivot-forming members for optional engagement with the lower ends of the derrick when the latter is in upright position whereby the engagement between the first pivot members and the derrick can be released leaving the derrick to pivot upon the second pivot-forming members and swing outwardly into an operative position, and an adjustable brace member adapted for engagement with the derrick below the offset bearing means and being attached at its other end to a rearward face of the truck body substantially above the lower end of the power driven means so as to extend in crossing position in relation to the power driven means when it is swung out into operative position.

3. A truck-body comprising transversely spaced upright members with rearwardly presented faces adjacent the rear end of the truck-body, pivot-forming members mounted adjacent the upper ends of said upright members and extending outwardly in overhanging relation thereto, said pivot-forming members having pivot means located rearwardly of said rearwardly presented faces, a derrick rockably and releasably mounted upon the pivot means of the pivot-forming members for optional movement from an approximately horizontal transport position to an upright position, said derrick being provided with offset bearing means projecting downwardly and being located between the pivot means and the plane of said rearwardly presented faces when the derrick is in transport position, said offset bearing means also projecting forwardly when the derrick is in vertical position, and hydraulic means operatively connected to the offset bearing means and extending downwardly therefrom between a vertical plane passing through the axis of the pivot means and the plane of rearwardly presented faces of the truck-body for optionally swinging the derrick upwardly and rearwardly with respect to the pivot-forming members and the rearwardly presented faces of the truck body.

References Cited in the file of this patent
UNITED STATES PATENTS

| Number | Name | Date |
| --- | --- | --- |
| 2,364,851 | Johansen | Dec. 12, 1944 |
| 2,433,598 | Chadwick, Jr. | Dec. 30, 1947 |
| 2,541,970 | Pospisil | Feb. 13, 1951 |
| 2,557,466 | Richards et al. | June 19, 1951 |
| 2,611,580 | Troche et al. | Sept. 23, 1952 |
| 2,616,666 | Honey | Nov. 4, 1952 |